US012691579B2

(12) United States Patent
Zhou

(10) Patent No.: US 12,691,579 B2
(45) Date of Patent: Jul. 28, 2026

(54) MOTION CONTROL METHOD, METHOD FOR GENERATING TRAJECTORY OF MOTION, AND ELECTRONIC DEVICE

(71) Applicant: BEIJING XIAOMI ROBOT TECHNOLOGY CO., LTD., Beijing (CN)

(72) Inventor: Mingliang Zhou, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 198 days.

(21) Appl. No.: 18/383,019

(22) Filed: Oct. 23, 2023

(65) Prior Publication Data

US 2024/0173860 A1 May 30, 2024

(30) Foreign Application Priority Data

Nov. 24, 2022 (CN) .......................... 202211496305.7

(51) Int. Cl.
*B25J 9/16* (2006.01)
*B62D 57/032* (2006.01)
(52) U.S. Cl.
CPC ........... *B25J 9/1664* (2013.01); *B62D 57/032* (2013.01); *G05B 2219/40395* (2013.01)
(58) Field of Classification Search
CPC ......... B25J 9/1664; G05B 2219/40395; B62D 57/032
See application file for complete search history.

(56) References Cited

U.S. PATENT DOCUMENTS 9,868,210 B1 1/2018 Whitman
2010/0211244 A1* 8/2010 Jeong ..................... G06T 19/003
701/25
(Continued)

FOREIGN PATENT DOCUMENTS

CN 110315543 A 10/2019
CN 111664851 A 9/2020
(Continued)

OTHER PUBLICATIONS

Riazi, S., et al., "Energy and Peak-power Optimization of Existing Time-optimal Robot Trajectories", Aug. 2016, IEEE, 2016 IEEE International Conference on Automation Science and Engineering (CASE), pp. 321-327 (Year: 2016).*
(Continued)

*Primary Examiner* — Abby Lin
*Assistant Examiner* — Karston G. Evans
(74) *Attorney, Agent, or Firm* — Arch & Lake LLP

(57) ABSTRACT

The present disclosure provides a motion control method and apparatus, and a method and apparatus for generating a trajectory of a motion. The motion control method is applied to a robot, and includes: generating, according to a type of a desired motion, at least one motion phase of a motion process and a time for each motion phase; determining, according to the at least one motion phase and the time of each motion phase, a desired pose of the robot at least one node during the motion process; inputting the desired pose as a reference value into a cost function model to obtain a trajectory of the desired motion, where the trajectory includes a pose and a control parameter of the robot at each sampling point during the motion process; and controlling the robot to move according to the trajectory of the desired motion.

20 Claims, 4 Drawing Sheets

(56) References Cited

U.S. PATENT DOCUMENTS

| | | | | |
|---|---|---|---|---|
| 2018/0107175 A1 | 4/2018 | Ha et al. | | |
| 2021/0107150 A1* | 4/2021 | Whitman | ............. | G05B 13/042 |
| 2023/0264356 A1* | 8/2023 | Jiang | ..................... | B25J 9/1679 |
| | | | | 700/245 |

FOREIGN PATENT DOCUMENTS

| | | |
|---|---|---|
| CN | 112207825 A | 1/2021 |
| CN | 113290559 A | 8/2021 |
| CN | 113753150 A | 12/2021 |
| CN | 114911221 A | 8/2022 |
| CN | 114986526 A | 9/2022 |
| CN | 115328186 A | 11/2022 |
| FR | 3113829 A1 | 3/2022 |
| FR | 3117393 A1 | 6/2022 |

OTHER PUBLICATIONS

Nguyen, C., Nguyen, Q., "Contact-timing and Trajectory Optimization for 3D Jumping on Quadruped Robots", Aug. 2022, arXiv (Year: 2022).*

Nguyen, C., et al., "Continuous Jumping for Legged Robots on Stepping Stones via Trajectory Optimization and Model Predictive Control", Sep. 2022, arXiv (Year: 2022).*

Li, Q., "Energy-Efficient Dynamic Motion Planning of Quadruped Robots via Whole-body Nonlinear Trajectory Optimization", Aug. 2022, IEEE, 2022 IEEE International Conference on Mechatronics and Automation, pp. 1610-1615 (Year: 2022).*

CNOA issued in Application No. 202211496305.7 dated Oct. 12, 2024 with English translation, (19p).

Katz, Benjamin G., "A Low Cost Modular Actuator for Dynamic Robots", Massachusetts Institute of Technology, Department of Mechanical Engineering, May 11, 2018, (104p).

Winkler, Alexander W., et al., "Gait and Trajectory Optimization for Legged Systems through Phase-based End-Effector Parameterization", IEEE Robotics and Automation Letters, Jan. 2018, (8p).

Extended European Search Report issued in Application No. 23210839.9 dated Apr. 29, 2024, (14p).

Quan Nguyen et al., "Optimized Jumping on the MIT Cheetah 3 Robot," IEEE, 2019 International Conference on Robotics and Automation (ICRA), XP033594375, Palais des congres de Monstreal, Monstreal, Canada, May 20-24, 2019, (7p).

Diego Pardo et al., "Hybrid direct collocation and control in the constraint-consistent subspace for dynamic legged robot locomotion," Robotics: Science and Systems XIII (Online), XP093148369, Jul. 12, 2017, (9p).

Teng Chen et al., "Optimized Method for Planning and Controlling the Somersault Motionof Quadruped Robot," 2021 IEEE, International Conference on Robotics and Automation(ICRA 2021), XP033990056, Xi'an China, May 31-Jun. 4, 2021, (7p).

Scott Gilroy et al., "Autonomous Navigation for Quadrupedal Robots with OptimizedJumping through Constrained Obstacles," 2021 IEEE 17th International Conference on Robotics and Automation(CASE), XP033983418, Lyon, France, Aug. 23-27, 2021, (8p).

Chuong Nguyen and Quan Nguyen: "Contact-timing and Trajectory Optimization for 3D Jumping on Quadruped Robots," Arxiv. Org, Cornell University Library, XP091171327, Mar. 10, 2022, (7p).

Ke Wang et al., "A Unified Model with Inertia Shaping for Highly Dynamic Jumps of Legged Robots," Arxiv.Org, Cornell University Library, XP091053120, Sep. 9, 2021, (8p).

Second Office Action issued to Chinese Application No. 202211496305.7 dated Feb. 13, 2025 with English translation (15p).

Ding Jiatao, "Online Gait Planning and Control for Humanoid Robots Based on Multiple Strategies Integration," School of Power and Mechanical Engineering, Wuhan University, May 2020, (136p).

Ren Dongyi, "Research on Disturbance Rejection and Trajectory Tracking Control of Quadruped Robot," Harbin University of Science and Technology, Jun. 2020, (129p).

Fabio Bergonti, "Torque and velocity controllers to perform jumps with a humanoid robot: theory and implementation on the iCub robot," 2019, (7p).

\* cited by examiner

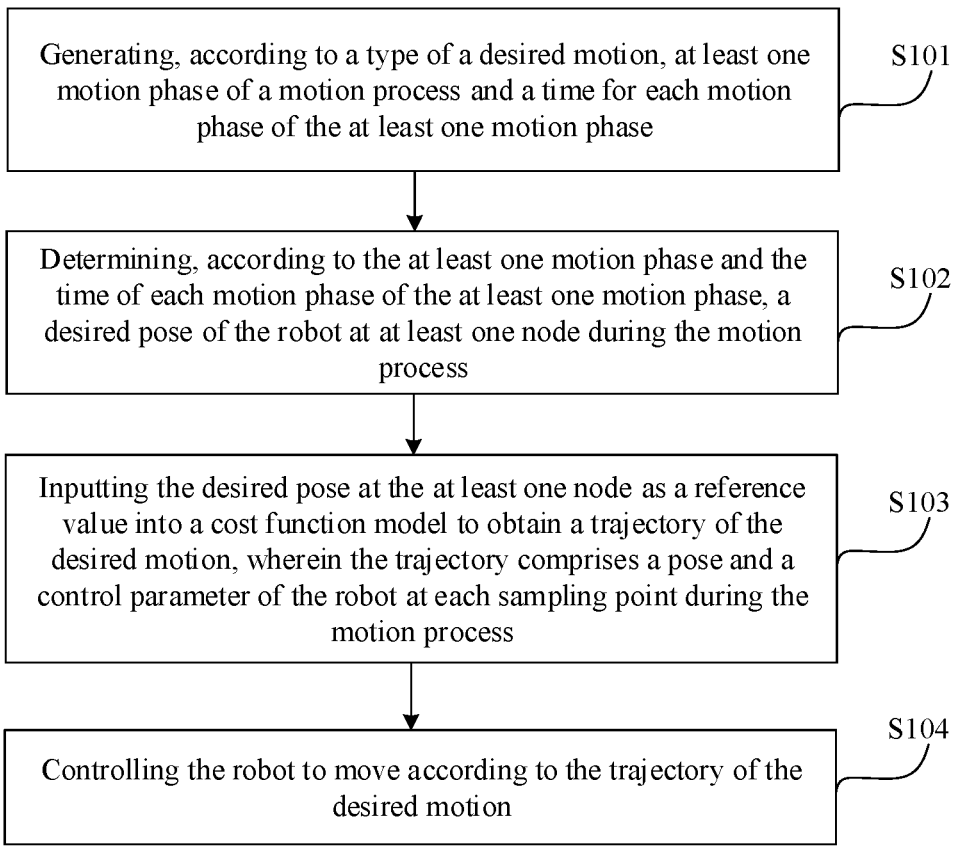

| Generating, according to a type of a desired motion, at least one motion phase of a motion process and a time for each motion phase of the at least one motion phase | S101 |

| Determining, according to the at least one motion phase and the time of each motion phase of the at least one motion phase, a desired pose of the robot at at least one node during the motion process | S102 |

| Inputting the desired pose at the at least one node as a reference value into a cost function model to obtain a trajectory of the desired motion, wherein the trajectory comprises a pose and a control parameter of the robot at each sampling point during the motion process | S103 |

| Controlling the robot to move according to the trajectory of the desired motion | S104 |

FIG. 1

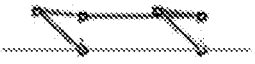

FIG. 2A

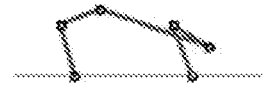

FIG. 2B

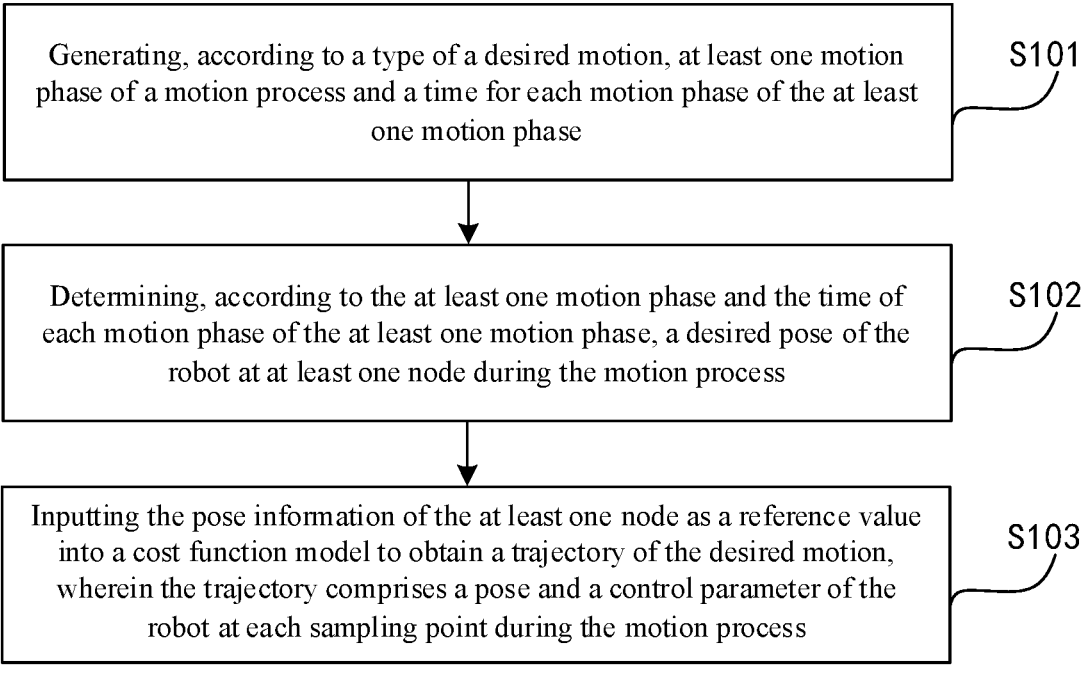

Generating, according to a type of a desired motion, at least one motion phase of a motion process and a time for each motion phase of the at least one motion phase                    S101

Determining, according to the at least one motion phase and the time of each motion phase of the at least one motion phase, a desired pose of the robot at at least one node during the motion process                    S102

Inputting the pose information of the at least one node as a reference value into a cost function model to obtain a trajectory of the desired motion, wherein the trajectory comprises a pose and a control parameter of the robot at each sampling point during the motion process                    S103

FIG. 3

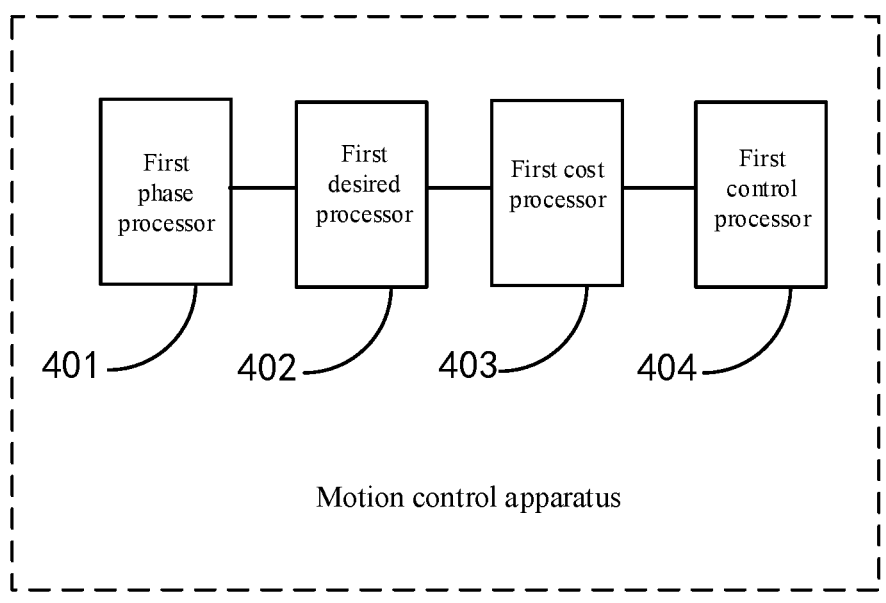

First phase processor          First desired processor          First cost processor          First control processor 401          402          403          404

Motion control apparatus

FIG. 4

MOTION CONTROL METHOD, METHOD FOR GENERATING TRAJECTORY OF MOTION, AND ELECTRONIC DEVICE

CROSS-REFERENCE TO RELATED APPLICATION

The present application is based upon and claims the benefit of priority to Chinese Patent Application No.: 202211496305.7, filed on Nov. 24, 2022, the contents of which are incorporated herein by reference in their entireties for all purposes.

TECHNICAL FIELD

The present disclosure relates to the field of robot technology, and in particular, to a motion control method, and a method for generating a trajectory of a motion, an electronic device, and a storage medium.

BACKGROUND

In recent years, robot technology has been constantly developing, becoming more intelligent and automated, and improving the richness, stability and flexibility of movements to varying degrees. Robots can gradually replace human labor and work in production and life, greatly improving people's work and life style. In particular, quadruped robots and humanoid robots are able to make more movements by relying on their multi-joint characteristics.

SUMMARY

The present disclosure provides a motion control method, a method for generating a trajectory of a motion, an electronic device, and a storage medium.

According to a first aspect of the embodiments of the present disclosure, a motion control method, applied to a robot, is provided. The method includes:

generating, according to a type of a desired motion, at least one motion phase of a motion process and a time for each motion phase of the at least one motion phase;

determining, according to the at least one motion phase and the time of each motion phase of the at least one motion phase, a desired pose of the robot at least one node during the motion process;

inputting the desired pose at the at least one node as a reference value into a cost function model to obtain a trajectory of the desired motion, where the trajectory includes a pose and a control parameter of the robot at each sampling point during the motion process; and controlling the robot to move according to the trajectory of the desired motion.

According to a second aspect of the embodiments of the present disclosure, a method for generating a trajectory of a motion is provided. The method includes:

generating, according to a type of a desired motion, at least one motion phase of a motion process and a time for each motion phase of the at least one motion phase;

determining, according to the at least one motion phase and the time of each motion phase of the at least one motion phase, a desired pose of the robot at least one node during the motion process; and inputting the desired pose at the at least one node as a reference value into a cost function model to obtain a trajectory of the desired motion, where the trajectory includes a pose and a control parameter of the robot at each sampling point during the motion process.

According to a third aspect of the embodiments of the present disclosure, a motion control method, applied to a robot, is provided. The method includes:

controlling the robot to move according to a pre-configured trajectory within the robot, where the trajectory is generated by the method as described in the second aspect.

According to a fourth aspect of the embodiments of the present disclosure, an electronic device is provided. The electronic device includes a memory and a processor. The memory is configured to store computer instructions runnable on the processor. The processor is configured to implement the method as described in the first aspect, the second aspect, or the third aspect when executing the computer instructions.

According to a fifth aspect of the embodiments of the present disclosure, a non-transitory computer-readable storage medium is provided on which a computer program is stored. The program, when executed by a processor, causes the processor to implement the method as described in the first aspect, the second aspect or the third aspect.

BRIEF DESCRIPTION OF THE DRAWINGS

The accompanying drawings herein are incorporated into and form a part of the specification, illustrate embodiments consistent with the present disclosure, and are used in conjunction with the specification to explain the principles of the present disclosure.

FIG. 1 is a flowchart of a motion control method illustrated according to an embodiment of the present disclosure.

FIG. 2A is a schematic diagram of a process in which a quadruped robot performs a front somersault, illustrated according to an embodiment of the present disclosure.

FIG. 2B is a schematic diagram of a process in which a quadruped robot performs a front somersault, illustrated according to an embodiment of the present disclosure.

FIG. 3 is a flowchart of a method for generating a trajectory of a motion illustrated according to another embodiment of the present disclosure.

FIG. 4 is a schematic diagram of a structure of a motion control apparatus illustrated according to an embodiment of the present disclosure.

DETAILED DESCRIPTION

Figure 2C:
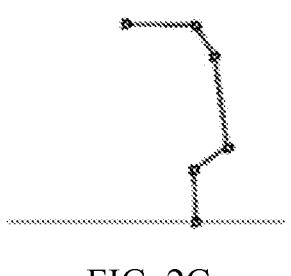
FIG. 2C is a schematic diagram of a process in which a quadruped robot performs a front somersault, illustrated according to an embodiment of the present disclosure.
Figure 2D:
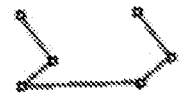
FIG. 2D is a schematic diagram of a process in which a quadruped robot performs a front somersault, illustrated according to an embodiment of the present disclosure.
Figure 2E:
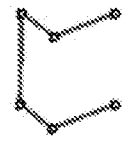
FIG. 2E is a schematic diagram of a process in which a quadruped robot performs a front somersault, illustrated according to an embodiment of the present disclosure.
Figure 2F:
FIG. 2F is a schematic diagram of a process in which a quadruped robot performs a front somersault, illustrated according to an embodiment of the present disclosure.

Embodiments will be described in detail herein, examples of which are represented in the accompanying drawings. When the following description refers to the accompanying drawings, the same numerals in different accompanying drawings indicate the same or similar elements unless otherwise indicated. The embodiments described in the following embodiments do not represent all embodiments consistent with the present disclosure. Rather, they are only examples of devices and methods consistent with some aspects of the present disclosure as detailed in the appended claims.

The terms used in the present disclosure are intended solely for the purpose of describing particular embodiments and are not intended to limit the present disclosure. The singular forms of "a/an," "said," and "the," as used in the present disclosure and the appended claims, are intended to include the plural form as well, unless the context clearly indicates other meaning. It should also be understood that the term "and/or" as used herein refers to and encompasses any or all possible combinations of one or more of the associated listed items.

It should be understood that while the terms first, second, third, etc. may be employed in the present disclosure to describe various types of information, such information should not be limited by these terms. These terms are only used to distinguish the same type of information from one another. For example, without departing from the scope of the present disclosure, first information may also be referred to as second information, and similarly, second information may be referred to as first information. Depending on the context, as used herein, the phrase "if . . . " may be interpreted as "at the time of . . . " or "when . . . " or "in response to determining . . . "

In recent years, robot technology has been constantly developing, becoming more intelligent and automated, and improving the richness, stability and flexibility of movements to varying degrees. Robots can gradually replace human labor and work in production and life, greatly improving people's work and life style. In particular, quadruped robots and humanoid robots are able to make more movements by relying on their multi-joint characteristics. In related technologies, robots can realize simple repetitive movements with high quality, but for some complex and time-consuming movements, robots cannot realize them with high quality or even complete them.

Based on the above, in a first aspect, a motion control method is provided by at least one embodiment of the present disclosure. Referring to FIG. 1, it illustrates a flowchart of this method including steps S101 to S104.

The method may be applied to a robot, e.g., a footed robot such as a quadruped robot, a humanoid robot, and the like. For example, the method may be applied to scenarios in which the robot is controlled to accomplish actions such as a forward somersault, a back somersault, and a jump.

In step S101, at least one motion phase of a motion process and a time for each motion phase of the at least one motion phase are generated according to a type of a desired motion.

Here, the term "desired motion" may refer to the motion that the robot is expected to accomplish, i.e., the motion that is about to be accomplished by controlling the robot. The type of the desired motion may be a forward somersault, a back somersault, a jump, and the like. A library of motion types may be pre-set within the robot, and the above motion types may be pre-configured within this library. Each type of motion can be divided into at least one motion phase, so that mapping relationships between the types of motion and the results on the division of motion phases can be pre-configured within the robot. The results on the division of motion phases may include at least one motion phase in the motion process, and the time of each motion phase, and then the corresponding result on the division of motion phases can be obtained by this step from the above mapping relationships according to the type of the desired motion.

Taking a quadruped robot that performs a forward somersault as an example, "somersault" (or "flip") is a highly athletic and ultra-limit movement, which has high requirements on the robot's joint output force and speed as well as balance control ability. Borrowing the definition of bionic or sports, somersault is a kind of body flip in the air, and in case of quadruped robots, a movement in which the body is flipped in a roll or pitch direction. In order to realize the somersault, it is necessary to achieve a large speed and angular velocity at the moment of takeoff, and maximize the use of the workspace of the four legs under a certain joint output power. Therefore, the motion process can be divided into a jumping phase and a flight phase. Referring to the motion process of the quadruped robot to complete the forward somersault shown in FIGS. 2A to 2F, FIGS. 2A to 2C show the jumping phase, and FIGS. 2C to 2F show the flight phase. It should be understood that the quadruped robot is simplified to a two-dimensional articulated model in the above figures.

In some embodiments, the desired motion may be sent to the robot by a remote control communicatively connected to the robot, or a terminal device installed with a robot control program. The desired motion may also be generated by the robot when planning the motion path based on the obstacle information, road condition information, etc., obtained by scanning. For example, when the robot performs a scan and determines that there is an obstacle in front of it, it may generate a jumping motion as the desired motion.

In step S102, a desired pose of the robot at least one node during the motion process is determined according to the at least one motion phase and the time of each motion phase of the at least one motion phase.

Here, a node is a specific sampling point during the motion process of the robot. For example, the node may be a start sampling point or an end sampling point of the motion phase, etc. The nodes are samples of all the sampling points in the motion process. The desired pose may include at least one of: a body displacement, a body attitude angle, and a joint angular displacement. Taking the robot illustrated in FIGS. 2A to 2F as an example, the robot includes a torso and legs, the body displacement and the body attitude angle may be the displacement and attitude angle of the torso, and the joint angular displacement may be the angular displacement of the hip joint, the angular displacement of the knee joint, or the angular displacement of the ankle joint on the legs.

A desired pose at a node may be determined based on the motion phase in which the node is in, and the position of the node in the motion phase. For example, if a node is as illustrated in FIG. 2C, the desired pose at the node can be determined based on a current pose of the robot and a relative relationship between the current pose and the pose shown in FIG. 2C.

For example, desired poses of the robot at a plurality of nodes during the motion process may be determined according to the at least one motion phase, the time of each motion phase of the at least one motion phase, and relative relationships between the desired poses of the robot at different nodes. This example further combines the relative relationships between the desired poses at the different nodes, which may constrain the desired poses at the nodes, thereby making the determined desired pose more accurate and close to reality.

The relative relationships between the desired poses of the robot at different nodes may be determined in the following manner: determining that any two nodes belong to a same motion phase, and determining the relative relationship between the desired poses of the robot at the two nodes according to positions of the two nodes in the motion phase. In some embodiments, the relative relationships between the desired poses at the different nodes may also be determined in other reasonable ways, and the present disclosure is not limited thereto.

For example, for the forward somersault shown in FIGS. 2A to 2F, the trajectories of the body in the Z and Pitch directions (i.e., the height of the body, and the angle of rotation of the body around the axis of rotation perpendicular to the plane) are mainly considered. In the flight phase, the motion in the Z direction is simplified as a free-fall motion, and the motion in the Pitch direction is simplified as a uniform motion, then the relative relationship between the desired pose at the start sampling point (i.e., the node shown in FIG. 2C) and the desired pose at the end sampling point (i.e., the node shown in FIG. 2F) can be determined in the above two directions:

Z direction: $P\_la=P\_lo+V\_lo*t\_fly-0.5*g*(t\_fly^2)$, where $P\_la$ denotes the body displacement at the end sampling point, $P\_lo$ denotes the body displacement at the start sampling point, $V\_lo$ denotes the body speed at the start sampling point, and $t\_fly$ denotes the time of the flight phase.

Pitch direction: $theta\_la=theta\_lo+W\_lo*t\_fly$, where $theta\_la$ denotes the body attitude angle at the end sampling point, $theta\_lo$ denotes the body attitude angle at the start sampling point, $W\_lo$ denotes the body angular velocity at the start sampling point, and $t\_fly$ denotes the time of the flight phase.

In step S103, the desired pose at the at least one node is input into a cost function model as a reference value to obtain a trajectory of the desired motion, where the trajectory includes a pose and a control parameter of the robot at each sampling point during the motion process.

Here, the control parameter may include a joint torque, a foot-end reaction force, and the like.

The cost function model includes the following terms to be optimized: at least one of a difference between a to-be-optimized pose at each sampling point and the desired pose at the at least one node, and a difference between a to-be-optimized pose at the at least one node and the desired pose at the at least one node; at least one of a to-be-optimized control parameter at each sampling point, and a difference between the to-be-optimized control parameter at each sampling point and the to-be-optimized control parameter at a previous sampling point; and a difference between a rate of change of the to-be-optimized pose at each sampling point and a rate of change of the to-be-optimized pose at a previous sampling point.

In some embodiments, each term to be optimized in the cost function model is provided with a corresponding weight.

Further, constraint conditions of the cost function model include at least one of: the to-be-optimized poses and/or the to-be-optimized control parameters at different sampling points meet a preset dynamics equation; and the to-be-optimized pose and/or the to-be-optimized control parameter at each sampling point meets a preset empirical range.

For example, for the forward somersault of the quadruped robot illustrated in FIGS. 2A to 2F, offline Trajectory Optimization and model predictive control (MPC) may be used to construct the following cost function model:

$$\blacksquare = W1*\|q(k)-q(N)\|2 + W2*\|\text{qbody\_flying} - \text{qbody\_des}\|2 + W3 \\ *\|\text{qdbody}(k)-\text{qdbody}(k-1)\|2 + W4*\|\tau(k)\|2 + W5 \\ *\|\tau(k)-\tau(k-1)\|2 \quad.$$

Here, Cost denotes the cost value; W1, W2, W3, W4, W5 denote 5 weights, respectively; $q(k)$ denotes the to-be-optimized pose of the robot at the $k^{th}$ (k=1 . . . N) sampling point, e.g., the to-be-optimized body displacement, to-be-optimized body attitude angle, and to-be-optimized joint angular displacement of the robot at the $k^{th}$ sampling point; $q(N)$ denotes the desired pose of the robot at the end sampling point of the flight phase (this sampling point is a node), e.g., the desired body displacement, desired body attitude angle, and desired joint angular displacement of the robot at the end sampling point of the flight phase; qbody\_flying denotes the to-be-optimized pose of the robot at the start sampling point of the flight phase (this sampling point is a node), e.g., the to-be-optimized body displacement, to-be-optimized body attitude angle, to-be-optimized joint angular displacement of the robot at the start sampling point of the flight phase; qbody\_des denotes the desired pose of the robot at the start sampling point of the flight phase (this sampling point is a node), e.g. the desired body displacement, desired body attitude angle, and desired joint angular displacement of the robot at the starting sampling point of the flight phase; $\text{qdbody}(k)$ denotes the rate of change of the to-be-optimized pose of the robot at the $k^{th}$ sampling point, e.g., the rate of change of the to-be-optimized body displacement, the rate of change of the to-be-optimized body attitude angle, and the rate of change of the to-be-optimized joint angular displacement of the robot at the $k^{th}$ sampling point; $\text{qdbody}(k-1)$ denotes the rate of change of the to-be-optimized pose of the robot at the $(k-1)^{th}$ sampling point, e.g., the rate of change of the to-be-optimized body displacement, the rate of change of the to-be-optimized body attitude angle, and the rate of change of the to-be-optimized joint angular displacement of the robot at the $(k-1)^{th}$ sampling point; $\tau(k)$ denotes the to-be-optimized joint torque of the robot at the $k^{th}$ sampling point, e.g., the to-be-optimized joint torque of the hip joint, the to-be-optimized joint torque of the knee joint, and the to-be-optimized joint torque of the ankle joint of the robot at the $k^{th}$ sampling point for each leg; and $\tau(k-1)$ denotes the to-be-optimized joint torque of the robot at the $(k-1)^{th}$ sampling point, e.g., the to-be-optimized joint torque of the hip joint, the to-be-optimized joint torque of the knee joint, and the to-be-optimized joint torque of the ankle joint of the robot at the $(k-1)^{th}$ sampling point for each leg.

In some embodiments, each term in the above cost function model can be split into the sum of multiple terms. For example, the first term (e.g., $q(k)-q(N)$) can be split into the sum of the following eight terms: body displacement, body attitude angle, angular displacement of the hip joint of the front leg, angular displacement of the knee joint of the front leg, angular displacement of the ankle joint of the front leg, angular displacement of the hip joint of the hind leg, angular displacement of the knee joint of the hind leg, and angular displacement of the ankle joint of the hind leg. The second term (e.g., qbody\_flying-qbody\_des) can be split into the sum of the following eight terms: body displacement, body attitude angle, angular displacement of the hip joint of the front leg, angular displacement of the knee joint of the front leg, angular displacement of the ankle joint of the front leg, angular displacement of the hip joint of the hind leg, angular displacement of the knee joint of the hind leg, and angular displacement of the ankle joint of the hind leg. The third term (e.g., qdbody(k)–qdbody(k–1)) can be split into the following eight terms: the rate of change of body displacement, the rate of change of body attitude angle, the rate of change of angular displacement of the hip joint of the front leg, the rate of change of angular displacement of the knee joint of the front leg, the rate of change of angular displacement of the ankle joint of the front leg, the rate of change of angular displacement of the hip joint of the hind leg, the rate of change of angular displacement of the knee joint of the hind leg, and the rate of change of angular displacement of the ankle joint of the hind leg. The fourth term (e.g., $\tau(k)$) can be split into the sum of the following six terms: the torque of the hip joint of the front leg, the torque of the knee joint of the front leg, the torque of the ankle joint of the front leg, the torque of the hip joint of the hind leg, the torque of the knee joint of the hind leg, and the torque of the ankle joint of the hind leg. The fifth term (e.g., $\tau(k)–\tau(k–1)$) can be split into the sum of the following six terms: the torque of the hip joint of the front leg, the torque of the knee joint of the front leg, the torque of the ankle joint of the front leg, the torque of the hip joint of the hind leg, the torque of the knee joint of the hind leg, and the torque of the ankle joint of the hind leg.

In addition, the constraint conditions of the cost function model may include:

Xdot_k+1=Xdot_k+Xddot_k*dt (i.e., the pose X satisfies the dynamics equation);

vel_foot_contact=0 (i.e., no slip at the end of the supporting foot);

pos_special>0.01 (i.e., special points such as knees, mid-torso points, etc. do not touch the ground);

force_foot_contact<force_max, force_foot_contact>force_min (i.e., the reaction force at the end of the supporting foot is within a normal range of the reaction force);

force_foot_swing=0 (i.e., the reaction force at the foot end of the swinging leg is zero);

joint_torque>–torque_max && joint_torque<torque_max (i.e., the joint torque is within a normal range of torque, this condition maximizes the use of the output torque of the joint and raises the robot motion limit);

joint_vel>–vel_max && joint_vel<vel_max (i.e., the joint revolving speed is within a normal range of revolving speed, this condition maximizes the use of the joint's revolving speed and raises the robot's motion limit).

In some embodiments, a nonlinear solution library, e.g., Interior Point OPTimizer (IPOPT), etc., can be used to optimize the cost function model and obtain the optimization results for each parameter to be optimized, e.g., the optimization result of the pose, the optimization result of the rate of change of the pose, the optimization result of the control parameter, etc.

The above steps S101 to S103 may optimize the trajectories for the robot online, or may optimize the trajectories for the robot offline in advance, i.e., the robot generates and optimizes the trajectories for each type of motion in accordance with the above steps when the robot is not in motion.

In step S104, the robot is controlled to move according to the trajectory of the desired motion.

For example, before the robot moves to any sampling point of the trajectory, a control parameter of the sampling point is updated according to a pose of the sampling point and a current pose of the robot; and the robot is controlled to move according to the updated control parameter. Preferably, the control parameter of a sampling point can be updated when approaching the sampling point, and the update result is more accurate because the current pose of the robot at this time is close to the actual pose of the sampling point.

For example, the following equation can be used to update the control parameter at the sampling point:

$$\tau = k^*\tau\_ff + kp^*(q - q\_cur) + kd^*(qd - qd\_cur).$$

Here, $\tau$ denotes the updated joint torque; $\tau\_ff$ denotes the pre-update joint torque; q denotes the pose at the sampling point (i.e., the optimization result of the pose in step S103); q_cur denotes the current pose of the robot; qd denotes the rate of change of the pose at the sampling point (i.e., the optimization result of the rate of change of the pose in step S103); qd_cur denotes the current rate of change of the robot's pose; k denotes the preset feedforward torque coefficient; kp denotes the pose gain; and kd denotes the speed gain.

In the motion control method provided by the embodiments of the present disclosure, at least one motion phase of a motion process, and a time for each motion phase of the at least one motion phase are generated according to a type of desired motion, so that a desired pose of a robot at least one node during the motion process can be determined according to the at least one motion phase, and the time for each motion phase of the at least one motion phase, and then the desired pose at the at least one node is input into a cost function model as a reference value to obtain a trajectory of the desired motion, and finally the robot can be controlled to move according to the trajectory of the desired motion. Due to the fact that the trajectory includes a pose and a control parameter at each sampling point, it can characterize highly complex, time-consuming, and difficult movements, based on which the robot can be controlled to move and to accurately complete the difficult movements, and the complexity of the movements that the robot is capable of completing can be extended. Furthermore, since the desired pose, which is used as a reference value for the cost function model, is determined according to the phase division of the motion process of the desired motion, the trajectory determined accordingly can accurately characterize the process of the desired motion.

In some embodiments, the determining, according to the at least one motion phase and the time of each motion phase of the at least one motion phase, the desired pose of the robot at the at least one node during the motion process, includes: determining, according to the at least one motion phase, the time of each motion phase of the at least one motion phase, and relative relationships between desired poses of the robot at different nodes, the desired poses of the robot at a plurality of nodes during the motion process.

In some embodiments, determining the relative relationships between the desired poses of the robot at different nodes, includes: determining that any two nodes belong to a same motion phase, and determining the relative relationship between the desired poses of the robot at the two nodes according to positions of the two nodes in the motion phase.

In some embodiments, the cost function model includes following terms to be optimized: at least one of a difference between a to-be-optimized pose at each sampling point and the desired pose at the at least one node, and a difference between a to-be-optimized pose at the at least one node and the desired pose at the at least one node; and at least one of a to-be-optimized control parameter at each sampling point, and a difference between the to-be-optimized control parameter at each sampling point and a to-be-optimized control parameter at a previous sampling point.

In some embodiments, the cost function model further includes a following term to be optimized: a difference between a rate of change of the to-be-optimized pose at each sampling point and a rate of change of the to-be-optimized pose at a previous sampling point.

In one embodiment, each term to be optimized in the cost function model is provided with a corresponding weight.

In one embodiment, constraint conditions of the cost function model include at least one of: the to-be-optimized poses at different sampling points meet a preset dynamics equation; the to-be-optimized control parameters at different sampling points meet a preset dynamics equation; the to-be-optimized poses and the to-be-optimized control parameters at different sampling points meet a preset dynamics equation; the to-be-optimized pose at each sampling point meets a preset empirical range; the to-be-optimized control parameter at each sampling point meets a preset empirical range; and the to-be-optimized pose and the to-be-optimized control parameter at each sampling point meet a preset empirical range.

In some embodiments, the desired pose includes at least one of: a body displacement, a body attitude angle, and a joint angular displacement; and/or the pose includes at least one of: a body displacement, a body attitude angle, and a joint angular displacement; and/or the control parameter includes a joint torque.

In some embodiments, the desired motion includes at least one of: a front somersault, a back somersault, and a jump.

In some embodiments, the controlling the robot to move according to the trajectory of the desired motion, includes: updating, before the robot moves to any sampling point of the trajectory, a control parameter of the sampling point according to a pose of the sampling point and a current pose of the robot; and controlling the robot to move according to the updated control parameter.

According to a second aspect of embodiments of the present disclosure, a method for generating a trajectory of a motion is provided. Referring to FIG. 3, it illustrates a flowchart of the method including steps S301 to S303.

In step S301, at least one motion phase of a motion process and a time for each motion phase of the at least one motion phase are generated according to a type of a desired motion.

In step S302, a desired pose of the robot at least one node during the motion process is determined according to the at least one motion phase and the time of each motion phase of the at least one motion phase.

In step S303, the pose information of the at least one node is input into a cost function model as a reference value to obtain a trajectory of the desired motion, where the trajectory includes a pose and a control parameter of the robot at each sampling point during the motion process.

The above three steps are the same as steps S101 to steps S103 in FIG. 1, and therefore the details of the steps will not be repeated here. In some embodiment, steps S301 to S303 may be run on the robot or on a computer used for developing the trajectory of motion of the robot. If the computer is used to perform the above three steps to develop the trajectory of the desired motion, the obtained trajectory may be configured into the robot.

According to a third aspect of the embodiments of the present disclosure, a motion control method, applied to a robot, is provided. The method includes:

controlling the robot to move according to a pre-configured trajectory within the robot, where the trajectory is generated by the method described in the second aspect.

This step is the same as step S104 in FIG. 1, and therefore the details of the step will not be repeated here. The trajectory used in this step is a pre-configured trajectory within the robot.

According to a fourth aspect of the embodiments of the present disclosure, a motion control apparatus, applied to a robot, is provided. Referring to FIG. 4, the apparatus includes:

a first phase processor 401 configured to generate, according to a type of a desired motion, at least one motion phase of a motion process and a time for each motion phase of the at least one motion phase;

a first desired processor 402 configured to determine, according to the at least one motion phase and the time of each motion phase of the at least one motion phase, a desired pose of the robot at least one node during the motion process;

a first cost processor 403 configured to input the desired pose at the at least one node as a reference value into a cost function model to obtain a trajectory of the desired motion, where the trajectory includes a pose and a control parameter of the robot at each sampling point during the motion process; and a first control processor 404 configured to control the robot to move according to the trajectory of the desired motion.

In some embodiments, the first desired processor is further configured to:

determine, according to the at least one motion phase, the time of each motion phase of the at least one motion phase, and relative relationships between desired poses of the robot at different nodes, the desired poses of the robot at a plurality of nodes during the motion process.

In some embodiments, the apparatus further includes a relationship processor configured to:

determine that any two nodes belong to a same motion phase, and determine the relative relationship between the desired poses of the robot at the two nodes according to positions of the two nodes in the motion phase.

In some embodiments, the cost function model includes following terms to be optimized:

at least one of a difference between a to-be-optimized pose at each sampling point and the desired pose at the at least one node, and a difference between a to-be-optimized pose at the at least one node and the desired pose at the at least one node; and at least one of a to-be-optimized control parameter at each sampling point, and a difference between the to-be-optimized control parameter at each sampling point and a to-be-optimized control parameter at a previous sampling point.

In some embodiments, the cost function model further includes a following term to be optimized: a difference between a rate of change of the to-be-optimized pose at each sampling point and a rate of change of the to-be-optimized pose at a previous sampling point.

In some embodiments, each term to be optimized in the cost function model is provided with a corresponding weight.

In some embodiments, constraint conditions of the cost function model include at least one of:

the to-be-optimized poses at different sampling points meet a preset dynamics equation;

the to-be-optimized control parameters at different sampling points meet a preset dynamics equation;

the to-be-optimized poses and the to-be-optimized control parameters at different sampling points meet a preset dynamics equation;

the to-be-optimized pose at each sampling point meets a preset empirical range;

the to-be-optimized control parameter at each sampling point meets a preset empirical range; and the to-be-optimized pose and the to-be-optimized control parameter at each sampling point meet a preset empirical range.

In some embodiments, the desired pose includes at least one of: a body displacement, a body attitude angle, and a joint angular displacement; and/or the pose includes at least one of: a body displacement, a body attitude angle, and a joint angular displacement; and/or the control parameter includes a joint torque.

In some embodiments, the desired motion includes at least one of: a front somersault, a back somersault, and a jump.

In some embodiments, the controlling the robot to move according to the trajectory of the desired motion, includes:

updating, before the robot moves to any sampling point of the trajectory, a control parameter of the sampling point according to a pose of the sampling point and a current pose of the robot; and controlling the robot to move according to the updated control parameter.

According to a fifth aspect of the embodiments of the present disclosure, an apparatus for generating a trajectory of a motion is provided. The apparatus includes:

a second phase processor configured to generate, according to a type of a desired motion, at least one motion phase of a motion process and a time for each motion phase of the at least one motion phase;

a second desired processor configured to determine, according to the at least one motion phase and the time of each motion phase of the at least one motion phase, a desired pose of the robot at least one node during the motion process; and a second cost processor configured to input the desired pose at the at least one node as a reference value into a cost function model to obtain a trajectory of the desired motion, where the trajectory includes a pose and a control parameter of the robot at each sampling point during the motion process.

According to a sixth aspect of the embodiments of the present disclosure, a motion control apparatus, applied to a robot, is provided. The apparatus includes a second control processor configured to:

control the robot to move according to a pre-configured trajectory within the robot, where the trajectory is generated by the method as described in the second aspect.

With regard to the apparatus in the above embodiments, the specific manner in which each processor performs an operation has been described in detail in the embodiments relating to the method in the first aspect, and will not be described in detail here.

Figure 5:
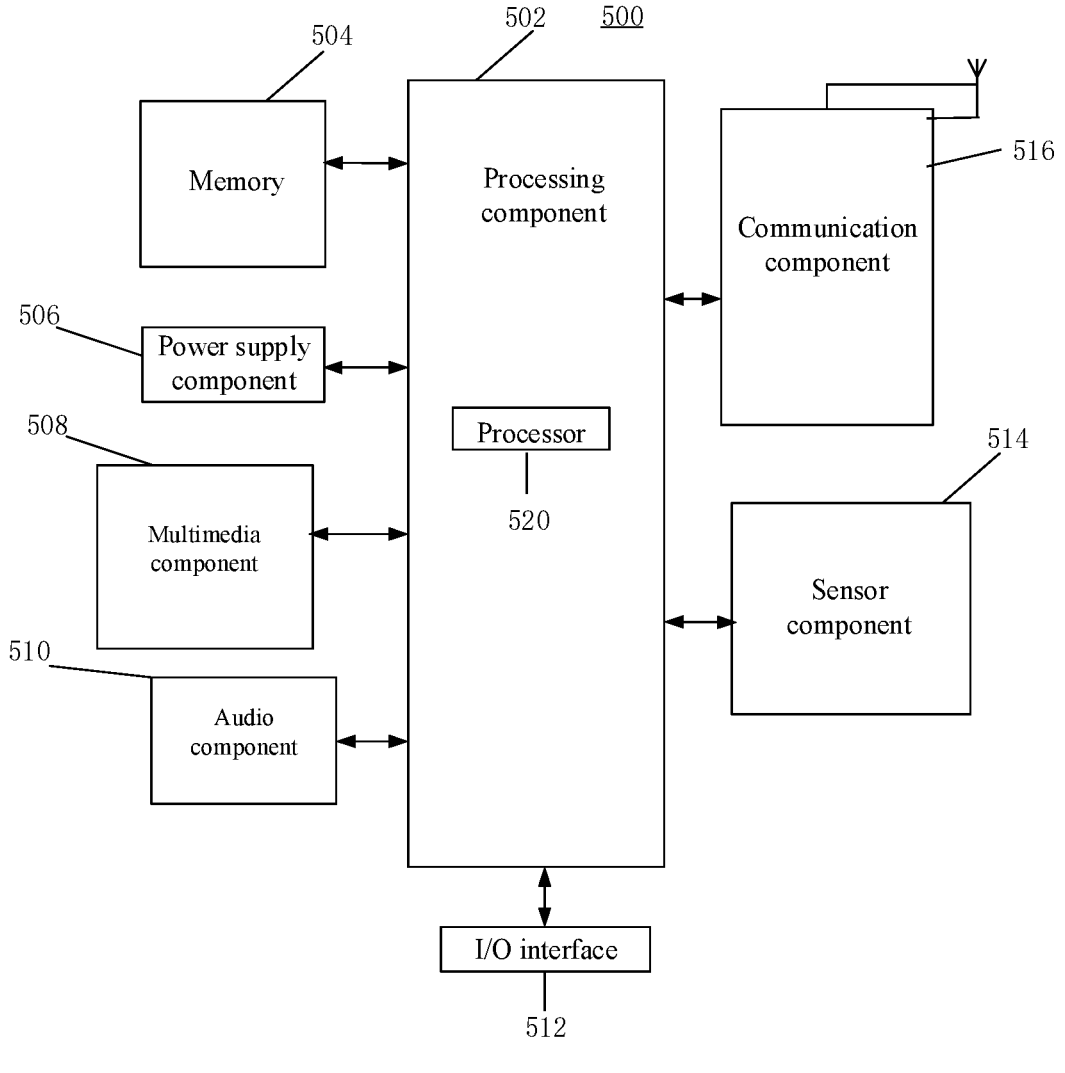
FIG. 5 is a block diagram of a structure of an electronic device illustrated according to an embodiment of the present disclosure.

According to a seventh aspect of the embodiments of the present disclosure, reference is made to FIG. 5, which for example illustrates a block diagram of an electronic device. For example, the device 500 may be a cell phone, a computer, a digital broadcast terminal, a message transceiver device, a game console, a tablet device, a medical device, a fitness device, a personal digital assistant, and the like.

Referring to FIG. 5, the device 500 may include one or more of the following components: a processing component 502, a memory 504, a power supply component 506, a multimedia component 508, an audio component 510, an input/output (I/O) interface 512, a sensor component 514, and a communication component 516.

The processing component 502 generally controls the overall operation of the device 500, such as operations associated with displays, telephone calls, data communications, camera operations, and recording operations. The processing component 502 may include one or more processors 520 to execute instructions to accomplish all or some of the steps of the methods described above. In addition, the processing component 502 may include one or more processors to facilitate interaction between the processing component 502 and other components. For example, the processing component 502 may include a multimedia processor to facilitate interaction between the multimedia component 508 and the processing component 502.

The memory 504 is configured to store various types of data to support operation at the device 500. Examples of such data include instructions for any application or method operated on the device 500, contact data, phone book data, messages, pictures, videos, etc. The memory 504 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, Disk or CD-ROM.

The power supply component 506 provides power to various components of the device 500. The power supply component 506 may include a power management system, one or more power sources, and other components associated with generating, managing, and distributing power for the device 500.

The multimedia component 508 includes a screen providing an output interface between the device 500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panel. The touch sensors may not only sense the boundaries of the touch or swipe action, but also detect the duration and pressure associated with said touch or swipe operation. In some embodiments, the multimedia component 508 includes a front camera and/or a rear camera. The front camera and/or the rear camera may receive external multimedia data when the device 500 is in an operational mode, such as a shooting mode or a video mode. Each front camera and rear camera may be a fixed optical lens system or have a focal length and optical zoom capability.

The audio component 510 is configured to output and/or input audio signals. For example, the audio component 510 includes a microphone (MIC) configured to receive external audio signals when the device 500 is in an operational mode, such as a call mode, a recording mode, and a voice recognition mode. The received audio signals may be further stored in memory 504 or sent via communication component 516. In some embodiments, the audio component 510 further includes a speaker for outputting audio signals.

The I/O interface 512 provides an interface between the processing component 502 and a peripheral interface equipment, and the peripheral interface equipment may be a keypad, a click wheel, a button, and the like. These buttons may include, but are not limited to: a home button, a volume button, a start button, and a lock button.

The sensor component 514 includes one or more sensors for providing an assessment of various aspects of the status of the device 500. For example, the sensor component 514 may detect an open/closed state of the device 500, the relative positioning of components, such as the components being the display and keypad of the device 500, and the sensor component 514 may also detect a change in the position of the device 500 or of one of the components of the device 500, the presence or absence of user contact with the device 500, the orientation or acceleration/deceleration of the device 500 and a change in temperature of the device 500. The sensor component 514 may also include a proximity sensor configured to detect the presence of a nearby object in the absence of any physical contact. The sensor component 514 may also include a light sensor, such as a CMOS or CCD image sensor, for use in imaging applications. In some embodiments, the sensor component 514 may also include an acceleration sensor, a gyroscope sensor, a magnetic sensor, a pressure sensor, or a temperature sensor.

The communication component 516 is configured to facilitate communication between the device 500 and other devices by wired or wireless means. The device 500 may access a wireless network based on a communication standard, such as Wi-Fi, 2G or 3G, 4G or 5G or a combination thereof. In an embodiment, the communication component 516 receives broadcast signals or broadcast-related information from an external broadcast management system via a broadcast channel. In an embodiment, the communication component 516 further includes a near field communication (NFC) transmitter to facilitate short range communication. For example, the NFC transmitter may be implemented based on Radio Frequency Identification (RFID) technology, Infrared Data Association (IrDA) technology, Ultra Wide Band (UWB) technology, Bluetooth® (BT) technology and other technologies.

In some embodiments, the device 500 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for executing the methods described above.

In an eighth aspect, the present disclosure also provides, in some embodiments, a non-transitory computer-readable storage medium including instructions, such as the memory 504 including instructions, the instructions being executable by the processor 520 of the device 500 to accomplish the methods described above. For example, the non-transitory computer-readable storage medium may be a ROM, random access memory (RAM), CD-ROM, magnetic tape, floppy disk, and optical data storage device, among others.

Other embodiments of the present disclosure will readily come to mind to those skilled in the art upon consideration of the specification and practice of the disclosure disclosed herein. This application is intended to cover any variations, uses, or adaptations of the present disclosure that follow the general principles of the present disclosure and include means of common knowledge or customary skill in the art not disclosed herein. The specification and embodiments are to be regarded as only an example, and the true scope and spirit of the present disclosure is indicated by the following claims.

It should be understood that the present disclosure is not limited to the precise structure that has been described above and illustrated in the accompanying drawings, and that various modifications and changes may be made without departing from its scope. The scope of the present disclosure is limited only by the appended claims.

What is claimed is:

1. A motion control method, applied to a robot, the method comprising:

generating, according to a type of a desired motion, at least one motion phase of a motion process and a time for each motion phase of the at least one motion phase;

determining, according to the at least one motion phase and the time of each motion phase of the at least one motion phase, a desired pose of the robot at at least one node during the motion process;

inputting the desired pose at the at least one node as a reference value into a cost function model to obtain a trajectory of the desired motion, wherein the trajectory comprises a pose and a control parameter of the robot at each of a plurality of sampling points during the motion process; and controlling the robot to move according to the trajectory of the desired motion;

wherein determining, according to the at least one motion phase and the time of each motion phase of the at least one motion phase, the desired pose of the robot at the at least one node during the motion process, comprises:

determining, according to the at least one motion phase, the time of each motion phase of the at least one motion phase, and relative relationships between desired poses of the robot at different nodes, the desired poses of the robot at a plurality of nodes during the motion process; and wherein determining the relative relationships between the desired poses of the robot at different nodes, comprises:

determining that any two nodes belong to a same motion phase, and determining a relative relationship between the desired poses of the robot at the two nodes according to positions of the two nodes in the motion phase and a preset motion function relationship between the two nodes.

2. The method of claim 1, wherein the cost function model comprises the following to-be-optimized terms:

at least one of a difference between a to-be-optimized pose at each of the plurality of sampling points and the desired pose at the at least one node, and a difference between a to-be-optimized pose at the at least one node and the desired pose at the at least one node; and at least one of a to-be-optimized control parameter at each of the plurality of sampling points, and a difference between the to-be-optimized control parameter at each of the plurality of sampling points and a to-be-optimized control parameter at a previous sampling point.

3. The method of claim 2, wherein the cost function model further comprises the following to-be-optimized term:

a difference between a rate of change of the to-be-optimized pose at each of the plurality of sampling points and a rate of change of the to-be-optimized pose at a previous sampling point.

4. The method of claim 2, wherein each to-be-optimized term in the cost function model is provided with a corresponding weight.

5. The method of claim 2, wherein constraint conditions of the cost function model comprise at least one of the following conditions:

the to-be-optimized poses at different sampling points meet a preset dynamics equation;

the to-be-optimized control parameters at different sampling points meet the preset dynamics equation;

the to-be-optimized pose at each of the plurality of sampling points meets a preset empirical range; or the to-be-optimized control parameter at each of the plurality of sampling points meets the preset empirical range.

6. The method of claim 1, wherein the desired pose comprises at least one of: a body displacement, a body attitude angle, and a joint angular displacement, and the pose comprises at least one of: a body displacement, a body attitude angle, and a joint angular displacement; or the control parameter comprises a joint torque.

7. The method of claim 1, wherein the desired motion comprises at least one of: a front somersault, a back somersault, and a jump.

8. The method of claim 1, wherein controlling the robot to move according to the trajectory of the desired motion comprises:

updating, before the robot moves to any sampling point of the trajectory, a control parameter of the sampling point according to a pose of the sampling point and a current pose of the robot; and controlling the robot to move according to an updated control parameter.

9. An electronic device, applied to a robot, the electronic device comprising a memory and a processor, wherein the memory is configured to store computer instructions executable by the processor; and the processor is configured to implement, when executing the computer instructions, acts comprising:

generating, according to a type of a desired motion, at least one motion phase of a motion process and a time for each motion phase of the at least one motion phase;

determining, according to the at least one motion phase and the time of each motion phase of the at least one motion phase, a desired pose of the robot at at least one node during the motion process;

inputting the desired pose at the at least one node as a reference value into a cost function model to obtain a trajectory of the desired motion, wherein the trajectory comprises a pose and a control parameter of the robot at each of a plurality of sampling points during the motion process;

controlling the robot to move according to the trajectory of the desired motion;

determining, according to the at least one motion phase, the time of each motion phase of the at least one motion phase, and relative relationships between desired poses of the robot at different nodes, the desired poses of the robot at a plurality of nodes during the motion process; and determining that any two nodes belong to a same motion phase, and determine a relative relationship between the desired poses of the robot at the two nodes according to positions of the two nodes in the motion phase and a preset motion function relationship between the two nodes.

10. The electronic device of claim 9, wherein the cost function model comprises following to-be-optimized terms:

at least one of a difference between a to-be-optimized pose at each of the plurality of sampling points and the desired pose at the at least one node, and a difference between a to-be-optimized pose at the at least one node and the desired pose at the at least one node; and at least one of a to-be-optimized control parameter at each of the plurality of sampling points, and a difference between the to-be-optimized control parameter at each of the plurality of sampling points and a to-be-optimized control parameter at a previous sampling point.

11. The electronic device of claim 10, wherein the cost function model further comprises the following to-be-optimized term:

a difference between a rate of change of the to-be-optimized pose at each of the plurality of sampling points and a rate of change of the to-be-optimized pose at a previous sampling point.

12. The electronic device of claim 10, wherein each to-be-optimized term in the cost function model is provided with a corresponding weight.

13. The electronic device of claim 10, wherein constraint conditions of the cost function model comprise at least one of the following conditions:

the to-be-optimized poses at different sampling points meet a preset dynamics equation;

the to-be-optimized control parameters at different sampling points meet the preset dynamics equation;

the to-be-optimized pose at each of the plurality of sampling points meets a preset empirical range; or the to-be-optimized control parameter at each of the plurality of sampling points meets the preset empirical range.

14. The electronic device of claim 9, wherein the desired pose comprises at least one of: a body displacement, a body attitude angle, and a joint angular displacement, and the pose comprises at least one of: a body displacement, a body attitude angle, and a joint angular displacement; or the control parameter comprises a joint torque.

15. The electronic device of claim 9, wherein the desired motion comprises at least one of: a front somersault, a back somersault, and a jump.

16. The electronic device of claim 9, wherein controlling the robot to move according to the trajectory of the desired motion comprises:

updating, before the robot moves to any sampling point of the trajectory, a control parameter of the sampling point according to a pose of the sampling point and a current pose of the robot; and controlling the robot to move according to an updated control parameter.

17. A non-transitory computer-readable storage medium having stored thereon a computer program, the program, when executed by one or more processors of a robot, causing the robot to perform operations comprising:

generating, according to a type of a desired motion, at least one motion phase of a motion process and a time for each motion phase of the at least one motion phase;

determining, according to the at least one motion phase and the time of each motion phase of the at least one motion phase, a desired pose of the robot at at least one node during the motion process;

inputting the desired pose at the at least one node as a reference value into a cost function model to obtain a trajectory of the desired motion, wherein the trajectory comprises a pose and a control parameter of the robot at each of a plurality of sampling points during the motion process; and controlling the robot to move according to the trajectory of the desired motion;

wherein determining, according to the at least one motion phase and the time of each motion phase of the at least one motion phase, the desired pose of the robot at the at least one node during the motion process, comprises:

determining, according to the at least one motion phase, the time of each motion phase of the at least one motion phase, and relative relationships between desired poses of the robot at different nodes, the desired poses of the robot at a plurality of nodes during the motion process; and wherein determining the relative relationships between the desired poses of the robot at different nodes, comprises:

determining that any two nodes belong to a same motion phase, and determining a relative relationship between the desired poses of the robot at the two nodes according to positions of the two nodes in the motion phase and a preset motion function relationship between the two nodes.

18. The non-transitory computer-readable storage medium of claim 17, wherein the cost function model comprises the following to-be-optimized terms:

at least one of a difference between a to-be-optimized pose at each of the plurality of sampling points and the desired pose at the at least one node, and a difference between a to-be-optimized pose at the at least one node and the desired pose at the at least one node; and at least one of a to-be-optimized control parameter at each of the plurality of sampling points, and a difference between the to-be-optimized control parameter at each of the plurality of sampling points and a to-be-optimized control parameter at a previous sampling point.

19. The non-transitory computer-readable storage medium of claim 18, wherein the cost function model further comprises the following to-be-optimized term:

a difference between a rate of change of the to-be-optimized pose at each of the plurality of sampling points and a rate of change of the to-be-optimized pose at a previous sampling point.

20. The non-transitory computer-readable storage medium of claim 18, wherein each to-be-optimized term in the cost function model is provided with a corresponding weight.

* * * * *